US010339744B2

(12) United States Patent
Lee

(10) Patent No.: US 10,339,744 B2
(45) Date of Patent: Jul. 2, 2019

(54) PORTABLE CASSETTE HOLDER

(71) Applicant: Nautilus Hyosung Inc., Seoul (KR)

(72) Inventor: Hee Youn Lee, Gyeonggi-do (KR)

(73) Assignee: NAUTILUS HYOSUNG INC., Soul (KR)

( * ) Notice: Subject to any disclaimer, the term of this patent is extended or adjusted under 35 U.S.C. 154(b) by 0 days.

(21) Appl. No.: 15/933,411

(22) Filed: Mar. 23, 2018

(65) Prior Publication Data

US 2018/0286164 A1 Oct. 4, 2018

(30) Foreign Application Priority Data

Mar. 31, 2017 (KR) ........................ 10-2017-0041892

(51) Int. Cl.
*G06Q 40/00* (2012.01)
*G07D 11/12* (2019.01)
*G07F 19/00* (2006.01)
*G07D 11/13* (2019.01)

(52) U.S. Cl.
CPC ........... *G07D 11/135* (2019.01); *G07D 11/13* (2019.01); *G07F 19/203* (2013.01); *G07F 19/205* (2013.01); *G07F 19/201* (2013.01)

(58) Field of Classification Search
CPC .... G07F 19/20; G07F 19/201; G06Q 20/1085
USPC .......................................................... 235/379
See application file for complete search history.

(56) References Cited

U.S. PATENT DOCUMENTS

| | | | | |
|---|---|---|---|---|
| 5,606,157 A * | 2/1997 | Awatsu | G06Q 20/1085 | 235/379 |
| 5,804,804 A * | 9/1998 | Fukatsu | G07D 11/0054 | 180/169 |
| 6,014,649 A * | 1/2000 | Kobayashi | G06Q 20/108 | 705/42 |
| 2002/0063035 A1* | 5/2002 | Blad | G06Q 20/1085 | 194/350 |
| 2004/0149817 A1* | 8/2004 | Kuroiwa | G06Q 20/341 | 235/379 |
| 2008/0011840 A1* | 1/2008 | MacKenzie | G07D 11/0066 | 235/385 |

* cited by examiner

*Primary Examiner* — Ahshik Kim
(74) *Attorney, Agent, or Firm* — Bacon & Thomas, PLLC

(57) ABSTRACT

A portable cassette holder includes a frame detachably coupled to an outer surface of an automated teller machine having a housing medium entrance, a conveying roller unit and a power supply connection unit. The frame includes a frame medium entrance formed at a position corresponding to the housing medium entrance and configured to mount a cassette thereon. The conveying roller unit is coupled to the frame at a position at which the frame medium entrance is provided, the conveying roller unit configured to convey a medium passing through the frame medium entrance. The power supply connection unit is provided in the frame and configured to be electrically connected to the automated teller machine so as to receive electric power.

7 Claims, 8 Drawing Sheets

PORTABLE CASSETTE HOLDER

CROSS-REFERENCE TO RELATED APPLICATION

This application is based on and claims priority from Korean Patent Application No. 10-2017-0041892, filed on Mar. 31, 2017, the disclosure of which is incorporated herein in its entirety by reference for all purposes.

TECHNICAL FIELD

The present disclosure relates to a portable cassette holder.

BACKGROUND

An automated teller machine is a device that can provide financial services such as the deposit and withdrawal of, e.g., cash without resort to time and place and without the help of bank employees.

Generally, the automated teller machine may include a main body for defining an external form, a deposit/withdrawal unit for depositing or withdrawing a medium through user's operation, a cassette module provided inside the main body and configured to store the medium, a conveying unit for conveying banknotes, a door rotatably coupled to the body to selectively open and close the main body, and the like.

In the case of such an automated teller machine, there is an inconvenience that the main body needs to be opened by operating the door every time when the medium stored in the cassette module is taken out of the main body or when the medium is replenished in the cassette module from the outside. Particularly, in the case where the approval of a bank official is required to open the main body, the procedure for obtaining the approval of a bank official is required every time when the medium is collected or replenished. This poses problems with convenience and accessibility.

Therefore, there is a need for a cassette assembly capable of taking out or replenishing a medium without opening the door of the main body.

SUMMARY

The present disclosure provides a portable cassette holder capable of taking out or replenishing a medium without having to open a main body of an automated teller machine and capable of being universally used in various automated teller machines.

In accordance with an aspect of the present disclosure, there is provided a portable cassette holder including: a frame detachably coupled to an outer surface of an automated teller machine having a medium entrance, the frame including a frame medium entrance formed at a position corresponding to the medium entrance of the automated teller machine, the frame configured to mount a cassette thereon; a conveying roller unit coupled to the frame at a location where the frame medium entrance is provided, the conveying roller unit configured to convey a medium passing through the frame medium entrance; and a power supply connection unit provided in the frame and configured to be electrically connected to the automated teller machine so as to receive electric power.

The frame may include a front frame having the frame medium entrance and the conveying roller unit, and a lower frame rotatably hinged to a lower portion of the front frame and configured to mount the cassette thereon.

The power supply connection unit may include a first power supply connection part provided on a bottom surface of the lower frame to be inserted into a power supply unit protruding from an outer surface of the automated teller machine so as to receive electric power, and a second power supply connection part provided on an upper surface of the lower frame to be inserted into a contact terminal portion formed on a bottom surface of the cassette.

The lower frame may be configured to be supported by the power supply unit.

A fixing protrusion protruding from the front frame, which is to be inserted into the automated teller machine, may be provided on a front surface of the front frame.

The fixing protrusion may be configured to be inserted into a fixing hole formed in the automated teller machine, and a locking groove, into which a hook provided in the fixing hole is to be inserted, is formed on an outer circumferential surface of the fixing protrusion.

The fixing protrusion may be made of a metal material and configured to be inserted into a fixing hole formed in the automated teller machine, and an electromagnet for selectively fastening the fixing protrusion may be provided in the fixing hole.

The front frame may be provided with a handle on an upper portion thereof, and the handle may be obliquely extended upward and rearward from the upper portion of the front frame.

In the case of the portable cassette holder according to one embodiment of the present disclosure, the medium can be taken out or replenished without having to open the main body of the automated teller machine.

Furthermore, the portable cassette holder according to one embodiment of the present disclosure can be widely used in various automated teller machines.

DETAILED DESCRIPTION

Figure 1:
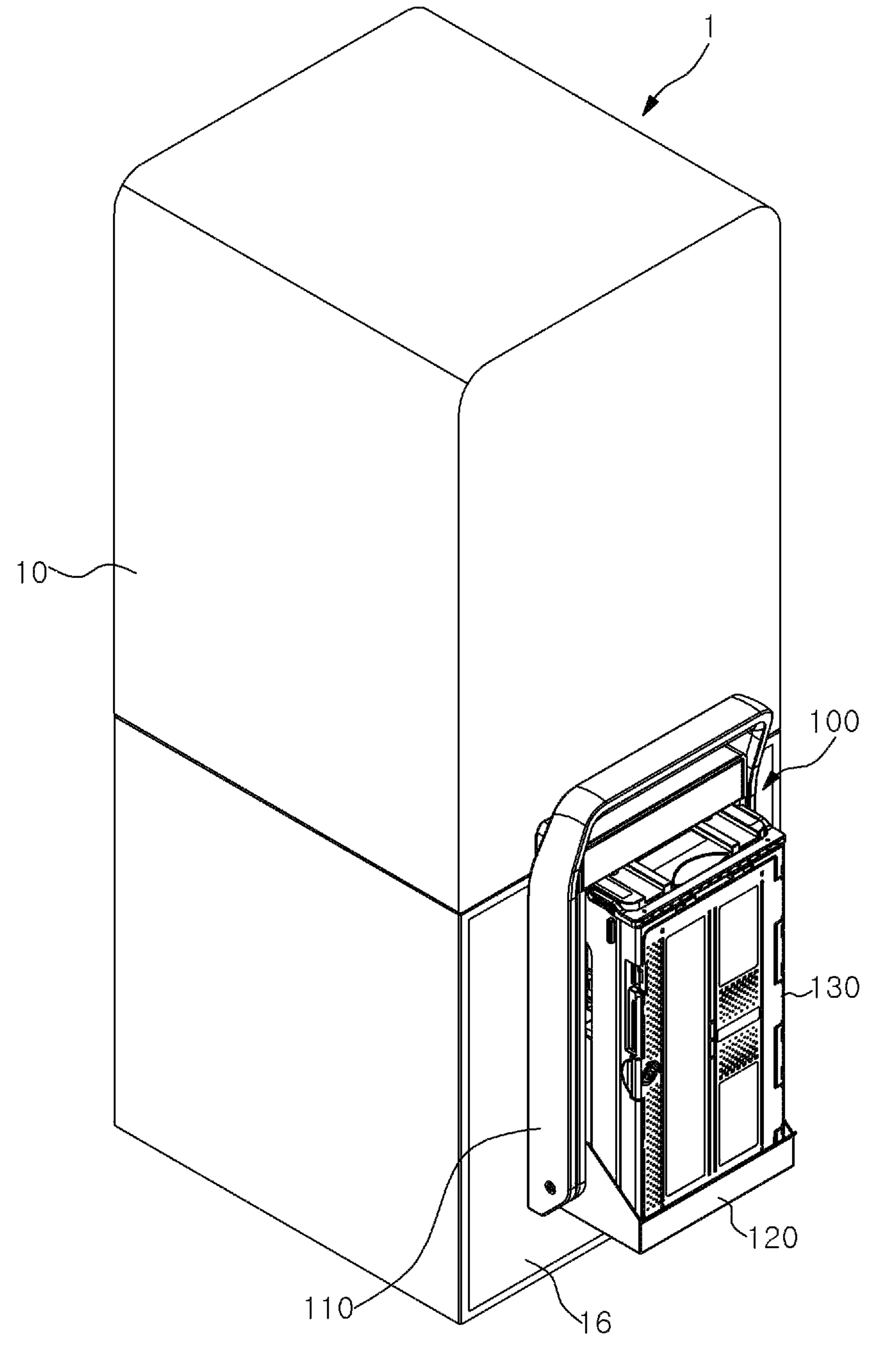
FIG. 1 is a schematic perspective view of an automated teller machine to which a portable cassette holder according to an embodiment of the present disclosure is coupled.

Hereinafter, configurations and operations of embodiments will be described in detail with reference to the accompanying drawings. The following description is one of various patentable aspects of the present disclosure and may form a part of the detailed description of the present disclosure.

However, in describing the present disclosure, detailed descriptions of known configurations or functions that make the present disclosure obscure may be omitted.

The present disclosure may be modified and include various embodiments. Specific embodiments will be exemplarily illustrated in the drawings and described in the detailed description of the embodiments. However, it should be understood that they are not intended to limit the present disclosure to specific embodiments but rather to cover all modifications, similarities, and alternatives that are included in the spirit and scope of the present disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Specific terms in the present disclosure are used simply to describe specific embodiments without limiting the present disclosure. An expression used in the singular encompasses the expression of the plural, unless it has a clearly different meaning in the context.

Figure 2:
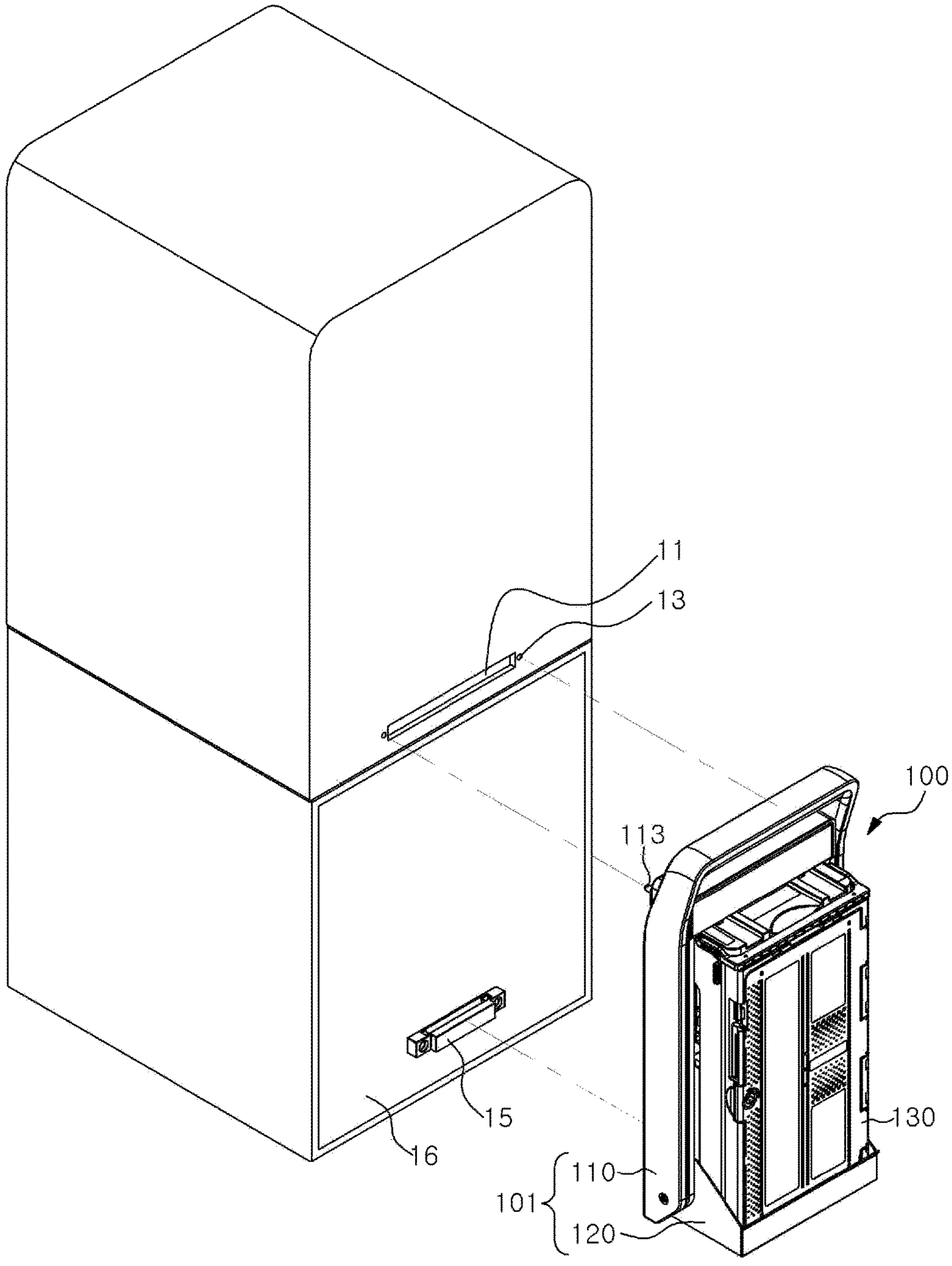
FIG. 2 is a schematic perspective view showing a state in which the portable cassette holder according to an embodiment of the present disclosure is separated from the automated teller machine.
Figure 3A:
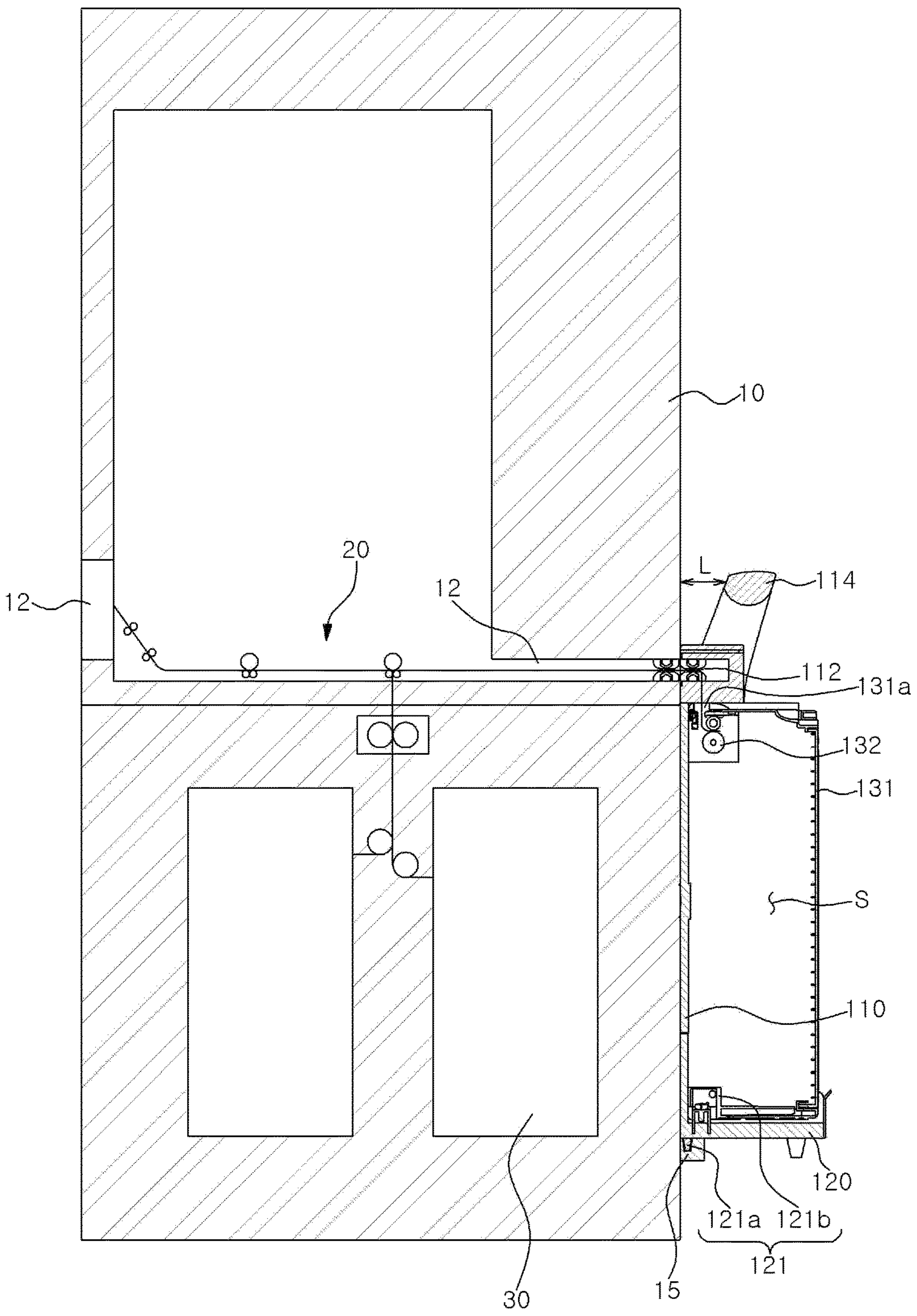
FIG. 3A is a schematic sectional view of the automated teller machine to which the portable cassette holder according to an embodiment of the present disclosure is coupled.
Figure 3B:
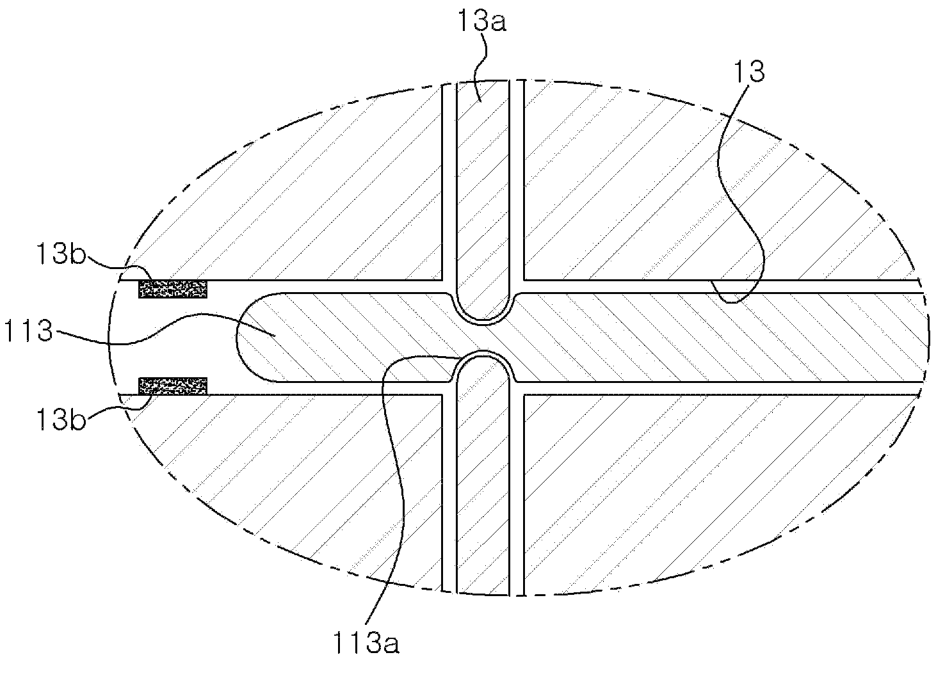
FIG. 3B is a schematic sectional view illustrating the coupling relationship between a fixing protrusion of the portable cassette holder according to an embodiment of the present disclosure and a fixing hole of the automated teller machine.

FIG. 1 is a schematic perspective view of an automated teller machine to which a portable cassette holder according to an embodiment of the present disclosure is coupled. FIG. 2 is a schematic perspective view showing a state in which the portable cassette holder according to an embodiment of the present disclosure is separated from the automated teller machine. FIG. 3A is a schematic sectional view of the automated teller machine to which the portable cassette holder according to an embodiment of the present disclosure is coupled, and FIG. 3B is a schematic sectional view illustrating the coupling relationship between a fixing protrusion of the portable cassette holder according to an embodiment of the present disclosure and a fixing hole of the automated teller machine.

Referring to FIGS. 1 to 3A and 3B, the portable cassette holder 100 according to an embodiment of the present disclosure may be detachably coupled to an automated teller machine 1. As used herein, the term "automated teller machine 1" means an automated device capable of providing financial services such as deposit and withdrawal of medium using a card or a bankbook regardless of time and place and without the help of a bank employee. The automated teller machine 1 may refer to various kinds of automated teller machines widely used in the art.

The automated teller machine 1 may include a housing 10, a conveying unit 20, and a medium storage unit 30.

The housing 10 may define the external form of the automated teller machine 1. The housing 10 may include a housing medium entrance 11 formed on one surface thereof and configured to introduce a medium into the housing 10 from the portable cassette holder 100 or take out a medium from the housing 10 toward the portable cassette holder 100. For example, the housing medium entrance 11 may be provided on the rear surface of the automated teller machine 1. Furthermore, a deposit/withdrawal unit 12 for allowing a user to deposit or withdraw a medium may be provided on the front surface of the housing 10. However, the housing medium entrance 11 and the deposit/withdrawal unit 12 may be provided in many other locations of the housing 10. Fixing holes 13 may be formed on both sides of the housing medium entrance 11, and fixing protrusions 113 of the portable cassette holder 100 may be inserted into the fixing holes 13. In each of the fixing holes 13, there may be provided hooks **13*a* that are inserted into a locking groove 113*a* formed on the outer circumferential surface of each of the fixing protrusions 113 when the fixing protrusions 113 are inserted into the fixing holes 13. In this case, the hooks 13*a* may be connected to a separate control unit so that the movement thereof can be controlled by the control unit. By providing the hooks 13*a* in each of the fixing holes 13 as described above, it is possible to increase the coupling force between the fixing protrusions 113 and the automated teller machine 1**.

In addition, the fixing protrusions 113 may be formed of a metal material and electromagnets **13*b* may be provided in the fixing holes 13 of the automated teller machine 1 to increase the coupling force of the fixing protrusions 113. The electromagnets 13*b* may be connected to a separate control unit to selectively fasten the fixing protrusions 113 to the fixing holes 13**.

Meanwhile, a separate shutter may be provided in the housing medium entrance 11 to selectively open and close the housing medium entrance 11. For example, when the fixing protrusions 113 are inserted into the fixing holes 13, the shutter may open the housing medium entrance 11. When the fixing protrusions 113 are withdrawn from the fixing holes 13, the shutter may close the housing medium entrance 11.

In addition, a medium storage unit 30 for storing a medium is provided in the inner space of the housing 10. For example, the medium storage unit 30 provided may be at least one cassette module. The medium may be conveyed to and from the medium storage unit 30 by the conveying unit 20. The conveying unit 20 may include a plurality of rollers and may guide the movement of the medium to the deposit/withdrawal unit 12, the medium storage unit 30 and the portable cassette holder 100.

The automated teller machine 1 described above is a typical configuration of the automated teller machine 1. It is to be noted that the configuration of the automated teller machine 1 does not limit the technical features of the present disclosure. In other words, the configuration of the automated teller machine 1 may be replaced with various configurations as long as it corresponds to the automated teller machine 1 in which a medium is required to be introduced or taken out.

Meanwhile, the portable cassette holder 100 may be detachably coupled to one surface of the automated teller machine 1 on which the housing medium entrance 11 is formed. Hereinafter, the configuration of the portable cassette holder 100 according to an embodiment of the present disclosure will be described with reference to FIGS. 4 to 6.

Figure 4:
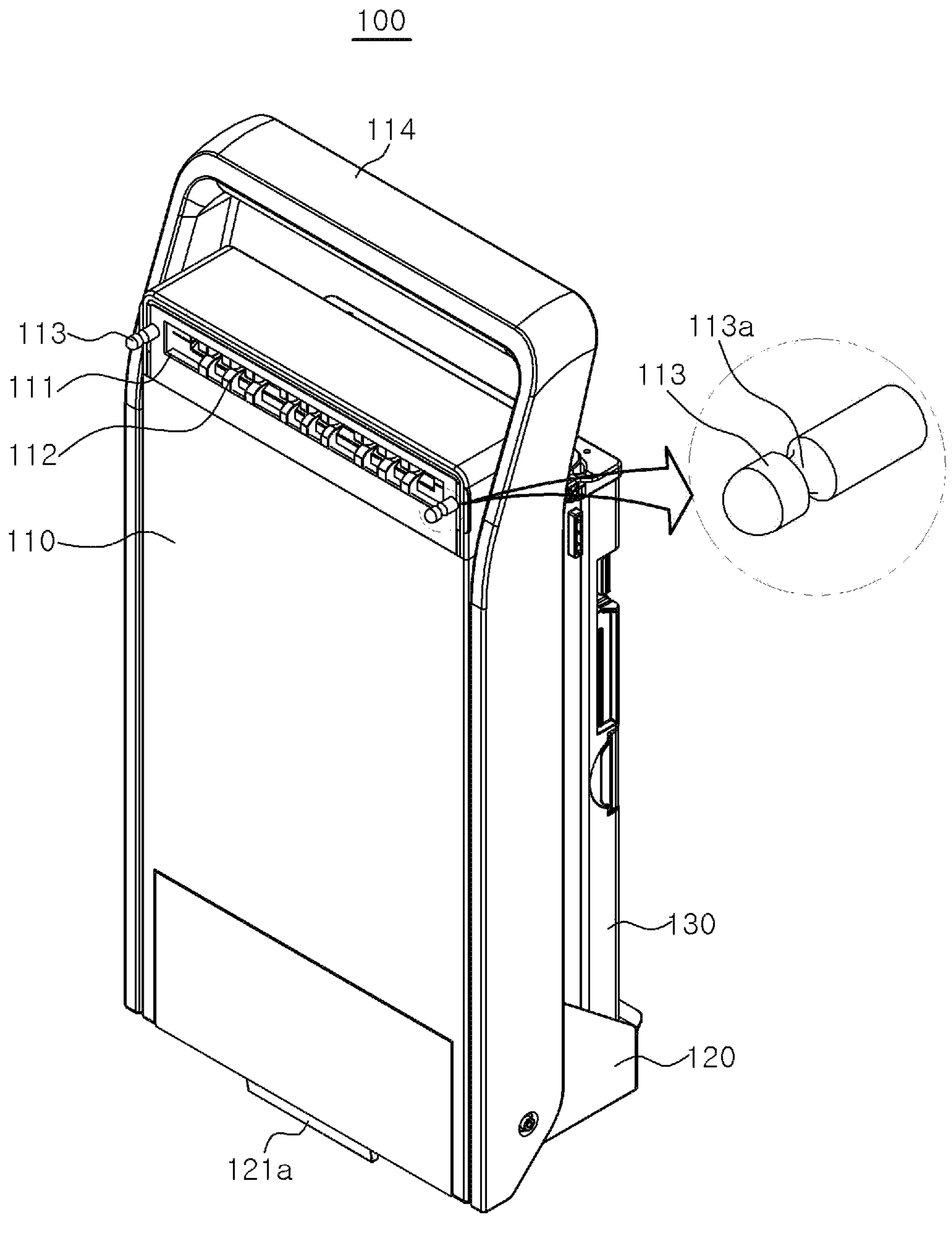
FIG. 4 is a schematic perspective view of the portable cassette holder according to an embodiment of the present disclosure.
Figure 5:
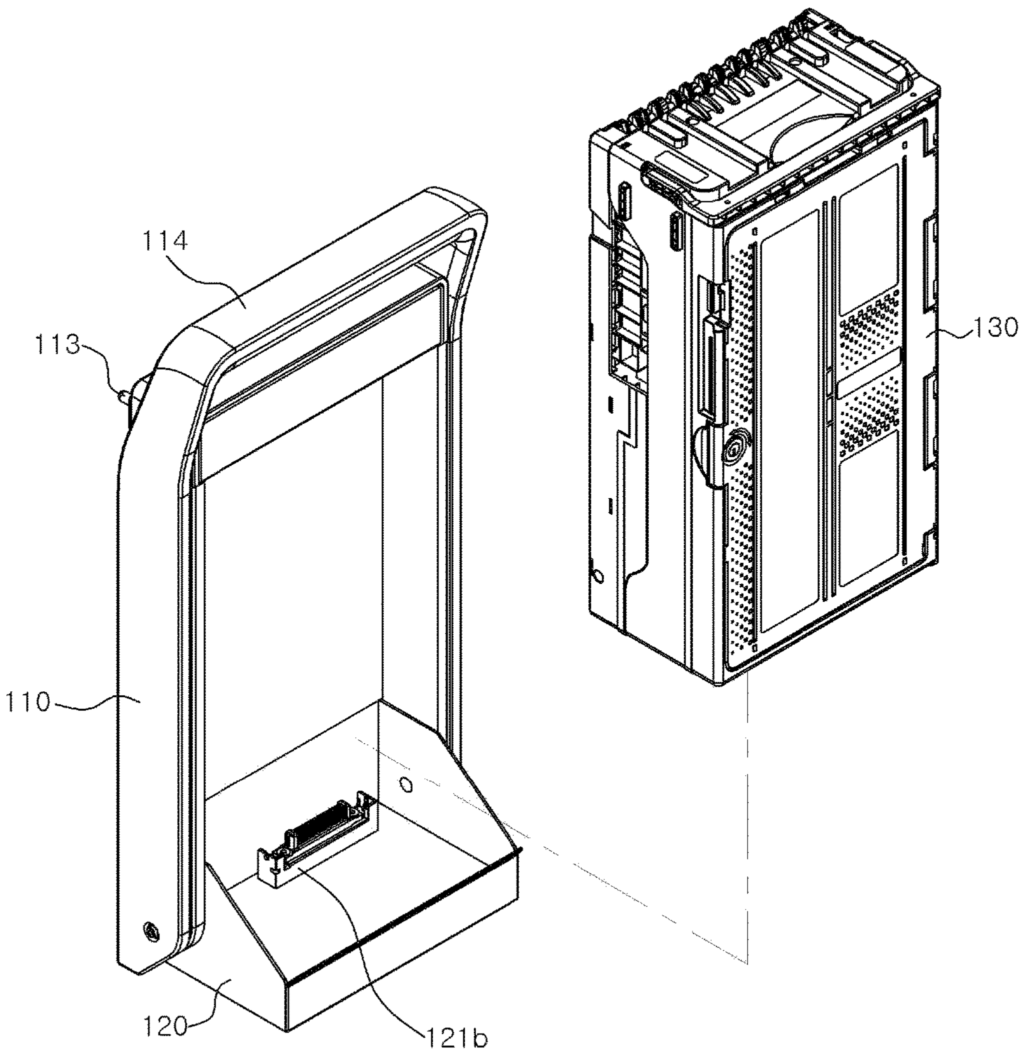
FIG. 5 is a schematic perspective view showing a state in which a cassette is separated from the portable cassette holder according to an embodiment of the present disclosure.
Figure 6:
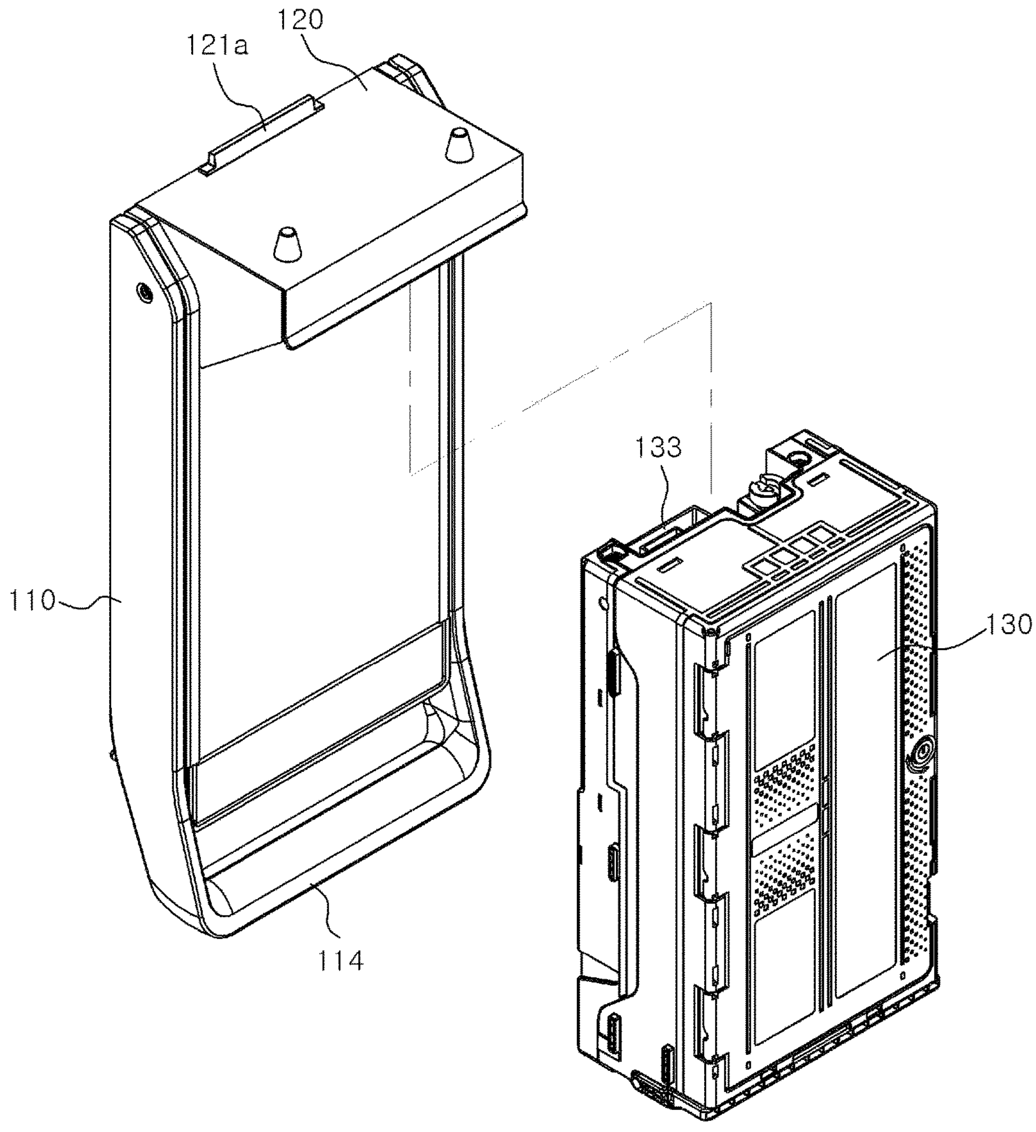
FIG. 6 is a schematic bottom perspective view showing a state in which the cassette is separated from the portable cassette holder according to an embodiment of the present disclosure.

FIG. 4 is a schematic perspective view of the portable cassette holder according to an embodiment of the present disclosure. FIG. 5 is a schematic perspective view showing a state in which a cassette is separated from the portable cassette holder according to an embodiment of the present disclosure. FIG. 6 is a schematic bottom perspective view showing a state in which the cassette is separated from the portable cassette holder according to an embodiment of the present disclosure.

Referring to FIGS. 4 to 6, the portable cassette holder 100 according to an embodiment of the present disclosure may be provided to introduce a medium into the automated teller machine 1 or to take out a medium from the automated teller machine 1. The portable cassette holder 100 may include a frame 101 detachably attached to the outer surface of the automated teller machine 1 with the housing medium entrance 11 and configured so that a cassette 130 is mounted to the frame 101, a conveying roller unit 112 coupled to the frame 101 and configured to feed a medium, and a power supply connection unit 121 provided in the frame 101 and electrically connected to the automated teller machine 1 to receive electric power.

The frame 101 may include a front frame 110 and a lower frame 120.

The front frame 110 may be detachably coupled to the outer surface of the automated teller machine 1. When coupled, the front surface of the frame 101 may be in contact with one surface of the automated teller machine 1. The front frame 110 may be provided with a frame medium entrance 111. A medium may be introduced into the portable cassette holder 100 through the frame medium entrance 111 or may be taken out from the portable cassette holder 100 to the automated teller machine 1. To this end, the frame medium entrance 111 may be provided at a position corresponding to the housing medium entrance 11 of the automated teller machine 1 when the front frame 110 is coupled to the automated teller machine 1. In other words, the housing medium entrance 11 and the frame medium entrance 111 may be connected to constitute a movement path for a medium.

On the upper portion of the front frame 110, a conveying roller unit 112 for conveying a medium may be provided. The conveying roller unit 112 may be connected to a separate driving source (not shown) to convey the medium taken out from the cassette 130 toward the housing medium entrance 11 or to convey the medium introduced through the housing medium entrance 11 toward the cassette 130. For example, the conveying roller unit 112 may be disposed on the rear side of the frame medium entrance 111.

A fixing protrusion 113 may be provided to protrude from the front surface of the front frame 110. The fixing protrusion 113 is inserted into a fixing hole 13 of the automated teller machine 1 to fix the front frame 110 when the portable cassette holder 100 is coupled to the automated teller machine 1. As an example, the fixing protrusion 113 may be provided on both sides of the frame medium entrance. By inserting the fixed protrusion 113 into the fixed hole 13, the portable cassette holder 100 may be stably attached to the automated teller machine 1 and the housing medium entrance 11 of the automated teller machine 1 may be easily aligned with the frame medium entrance 111 of the front frame 110.

As described above, a locking groove **113*a* may be formed on the outer circumferential surface of the fixing protrusion 113, and hooks 13*a* inserted into the locking groove 113*a* to lock the fixing protrusion 113 may be provided in the fixing hole 113 into which the fixing protrusion 113** is inserted.

The fixing protrusion 113 may be made of a metal material and an electromagnet **13*b* may be provided in the fixing hole 13 of the automated teller machine 1 to increase the coupling force of the fixing protrusion 113**.

A handle 114 may be provided on the upper portion of the front frame 110 for the user to easily grip and move the portable cassette holder 100. The handle 114 may have a variety of configurations as long as it can be gripped by the user. For example, the handle 114 may be obliquely extended upward and rearward and rearward from the upper portion of the front frame 110 so that the distance L to the automated teller machine 1 increases as it goes upward when the portable cassette holder 100 is coupled to the automated teller machine 1. Therefore, the user may grip the handle 114 without being hindered by the automated teller machine 1.

The lower frame 120 may be rotatably hinged to the lower portion of the front frame 110 on one side thereof. The cassette 130 may be seated on the upper surface of the lower frame 120. In this regard, the overall shape of the front frame 110 and the lower frame 120 coupled together may be an L shape.

The lower frame 120 may include a power supply connection unit 121 for supplying electric power to the cassette 130. The power supply connection unit 121 may be electrically connected to a power supply unit 15 of the automated teller machine 1 to receive electric power and may supply the received electric power to the cassette 130. For example, the power supply connection unit 121 may include a first power supply connection part **121*a* protruding from the bottom surface of the lower frame 120 and inserted into the power supply unit 15 of the automated teller machine 1 to receive electric power, and a second power supply connection part 121*b* electrically connected to the first power supply connection part 121*a* and provided on the upper surface of the lower frame 120 to supply electric power to the cassette 130**.

The power supply unit 15 may be provided to protrude from one surface of the automated teller machine 1, and more specifically, from one surface of the automated teller machine 1 on which the housing medium entrance 11 is formed. Thus, when the portable cassette holder 100 is coupled to the automated teller machine 1 and the first power supply connection part **121*a* is inserted into the power supply unit 15, the power supply unit 15 may support the lower side of the portable cassette holder 100, and more specifically, the lower frame 120**.

The cassette 130 may be detachably mounted on the upper surface of the lower frame 120. The cassette 130 may be provided for storage of a medium. For example, the cassette 130 may include: a casing 131 having a storage space S formed therein and a cassette medium entrance **131*a* provided on the upper side thereof; and a cassette roller unit 132 provided on the lower side of the cassette medium entrance 131*a* and configured to convey the medium introduced through the cassette medium entrance 131*a* to the storage space S or to convey the medium taken out through the cassette medium entrance 131*a* to the automated teller machine 10. In this case, the housing medium entrance 11, the frame medium entrance 111 and the cassette medium entrance 131*a*** may form one medium conveying path for moving the medium.

In addition, the cassette 130 may include various components other than the cassette roller unit 132 such as, for example, a push plate, a stack guide and the like. These components are well-known in the art and, therefore, will not be described in detail.

The cassette 130 may have on its bottom surface with a contact terminal portion 133 into which the second power supply connection part **121*b* is inserted and coupled to receive electric power for driving the cassette roller unit 132 and the like. In other words, when the cassette 130 is seated on and coupled to the lower frame 120, the second power supply connection part 121***b* of the lower frame 120 may be inserted into and electrically connected to the contact terminal portion 133 of the cassette 130 to supply electric power.

The portable cassette holder 100 according to an embodiment of the present disclosure is coupled to the automated teller machine 1 and is capable of supplying and taking out the medium to and from the automated teller machine 1 as described above. Hereinafter, a process of coupling the portable cassette holder 100 according to an embodiment of the present disclosure to the automated teller machine 1 will be described with reference to FIGS. 7A to 7D.

Figure 7A:
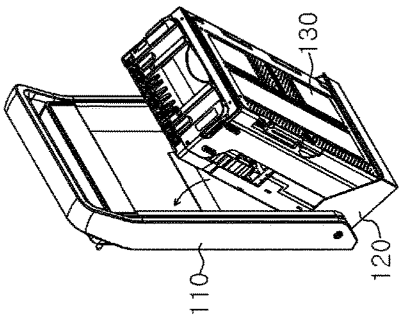
FIGS. 7A to 7D are schematic flow diagrams showing a process of coupling the portable cassette holder to the automated teller machine.
Figure 7B:
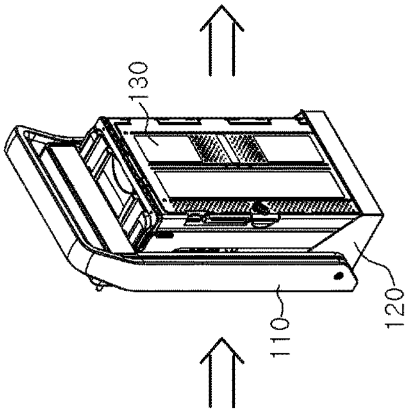

FIGS. 7A to 7D are schematic flow diagrams showing a process of coupling the portable cassette holder to the automated teller machine. Referring to FIG. 7A, a process of coupling the cassette 130 to the lower frame 120 may be first performed. At this time, the lower frame 120 of the portable cassette holder 100 may be swiveled. Accordingly, the user may mount the cassette 130 on the lower frame 120 and couple the cassette 130 to the lower frame 120. Thereafter, the user may complete the coupling of the cassette 130 by swiveling the cassette 130 in the reverse direction again (see FIG. 7B). When the cassette 130 is coupled to the lower frame 120, the second power supply connection part 121*b* of the lower frame 120 may be inserted into the contact terminal portion 133 on the bottom surface of the cassette 130.

Figure 7C:
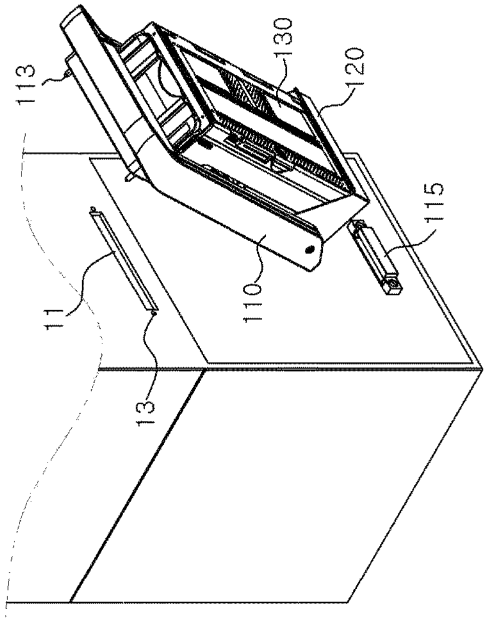
Figure 7D:
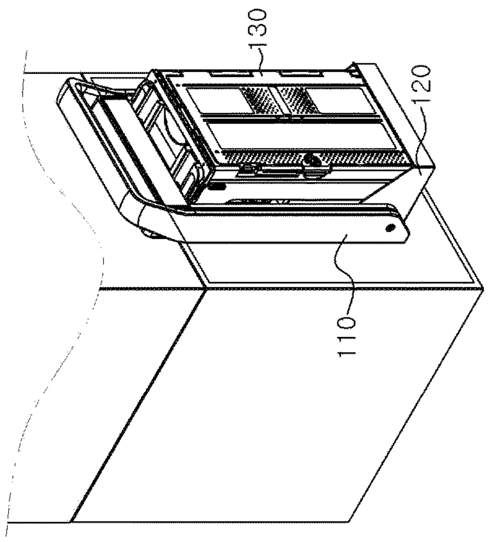

Then, the first power supply connection part 121*a* of the portable cassette holder 100 is inserted into the power supply unit 15 of the automatic teller machine 1 (see FIG. 7C). Thereafter, the portable cassette holder 100 is swiveled so that the fixing protrusion 113 can be inserted into and coupled to the fixing hole 13 of the automated teller machine 1 (see FIG. 7D). At this time, the first power supply connection part 121*a* and the power supply unit 15 are electrically and physically coupled to each other, whereby the electric power of the automated teller machine 1 can be supplied to the portable cassette holder 100.

The process of separating the portable cassette holder 100 from the automated teller machine 1 and separating the cassette 130 may be performed in the reverse order of the above-described process.

As a result, in the case of the portable cassette holder 100 according to an embodiment of the present disclosure, the user may attach and detach the portable cassette holder 100 to the automated teller machine 1 as necessary. Accordingly, it is possible to supply or take out the medium to the medium storage unit 30 without having to open the door 16 of the automated teller machine 1. In addition, since the portable cassette holder 100 according to an embodiment of the present disclosure can be independently transported, it is possible to widely use the portable cassette holder 100 in various automated teller machines.

While the present disclosure has been described above using the preferred embodiments, the scope of the present disclosure is not limited to the specific embodiments described above. A person having ordinary knowledge in the relevant technical field will be able to replace or modify the constituent elements. Such replacement or modification should be construed to fall within the scope of the present disclosure.

What is claimed is:

1. A portable cassette holder, comprising:

a frame detachably coupled to an outer surface of an automated teller machine having a medium entrance, the frame including a frame medium entrance formed at a position corresponding to the medium entrance of the automated teller machine, the frame configured to mount a cassette thereon;

a conveying roller unit coupled to the frame at a location where the frame medium entrance is provided, the conveying roller unit configured to convey a medium passing through the frame medium entrance; and a power supply connection unit provided in the frame and configured to be electrically connected to the automated teller machine so as to receive electric power;

wherein the frame includes:

a front frame having the frame medium entrance and the conveying roller unit; and a lower frame rotatably hinged to a lower portion of the front frame and configured to mount the cassette thereon.

2. The portable cassette holder of claim 1, wherein the power supply connection unit includes:

a first power supply connection part provided on a bottom surface of the lower frame to be inserted into a power supply unit protruding from an outer surface of the automated teller machine so as to receive electric power; and a second power supply connection part provided on an upper surface of the lower frame to be inserted into a contact terminal portion formed on a bottom surface of the cassette.

3. The portable cassette holder of claim 2, wherein the lower frame is configured to be supported by the power supply unit.

4. The portable cassette holder of claim 1, wherein the front frame further comprises a fixing protrusion, which is provided on a front surface of the front frame to be inserted into the automated teller machine.

5. The portable cassette holder of claim 4, wherein the fixing protrusion is configured to be inserted into a fixing hole formed in the automated teller machine, and a locking groove, into which a hook provided in the fixing hole is to be inserted, is formed on an outer circumferential surface of the fixing protrusion.

6. The portable cassette holder of claim 4, wherein the fixing protrusion is made of a metal material and configured to be inserted into a fixing hole formed in the automated teller machine, and an electromagnet for selectively fastening the fixing protrusion is provided in the fixing hole.

7. The portable cassette holder of claim 1, wherein the front frame is provided with a handle on an upper portion thereof, and the handle is obliquely extended upward and rearward from the upper portion of the from frame.

* * * * *